3,306,948
PROCESS FOR THE PREPARATION OF 1,4-DIENES
Thomas Joseph Kealy, Wilmington, Del., assignor to E. I. du Pont de Nemours and Company, Wilmington, Del., a corporation of Delaware
No Drawing. Filed Jan. 17, 1964, Ser. No. 338,285
28 Claims. (Cl. 260—680)

This application is a continuation-in-part of copending application Serial No. 264,053, filed March 11, 1963, to the same inventor.

This invention relates to a new catalytic process for effecting interaction of alpha-monoolefins and conjugated dienes to form 1,4-dienes.

Alpha-olefin elastomers are of increasing importance today. Particularly valuable are the copolymers containing sulfur-curable side-chain unsaturation resulting from incorporation of non-conjugated units. U.S. Patent 2,933,480, issued to Gresham and Hunt, describes representative copolymers of this type. Non-conjugated dienes for use in making them include 1,4-hexadiene itself and derivatives wherein the monomer still has one terminal vinyl group, e.g. 4-methyl-1,4-hexadiene. Other 1,4-diene containing elastomers are also important, as for example, the copolymer prepared by copolymerizing isobutylene with 2-alkyl-1,4-hexadienes in the presence of a cationic catalyst, e.g. a Friedel-Crafts catalyst such as boron trifluoride or stannic chloride-water.

It is an object of the present invention to provide a new process for making 1,4-dienes by reaction between conjugated dienes and alpha-monoolefins. It is another object of the present invention to provide a catalyst for the economical preparation of 1,4-dienes and particularly for the preparation of 1,4-hexadiene monomer from ethylene and 1,3-butadiene. Other objects will appear hereinafter.

These and other objects of the present invention are accomplished by the process which comprises contacting and reacting an alpha-olefin of the formula

wherein R" is H or $C_1$-$C_4$ alkyl, and a conjugated diene containing up to (and including) 16 carbon atoms and having the formula

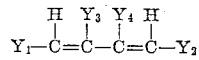

wherein $Y_1$ and $Y_2$ are independently selected from the group H and lower alkyl and wherein $Y_3$ and $Y_4$ are independently selected from the group H, lower alkyl and Cl, any two of the Y's may be joined together to form a cycloaliphatic ring having at least 6 ring carbon atoms; with the proviso that at least one Y is H, in the presence of a catalytic amount of a catalyst made by combining (a) at least two molar proportions of at least one organo metallic compound of the formula $RMX_n$, wherein R is alkyl, aryl, or aralkyl, M is Al, Zn, Cd, or Mg, $n$ is an integer representing the number of X groups required for valence satisfaction, e.g., when M is Al, $n=2$, and when M is Zn, Cd, or Mg, $n=1$, and X is independently selected from the group alkyl, aryl, aralkyl, Cl, and Br, with (b) a molar proportion of at least one nickel compound containing at least one monodentate phosphorous III ligand, said nickel compound being selected from the group consisting of nickel halide, nitrate, and carbonyl, and obtaining a 1,4-diene as a result thereof. The product made is free of allylic halide to avoid deactivation of the catalyst.

Typical examples of the alpha-monoolefins which can be employed include ethylene, which is preferred, propylene, and 1-hexene. Conjugated dienes which are co-dimerizable therewith include isoprene, 1,3-butadiene, which is preferred, 1,3-pentadiene, 2,4-hexadiene, 2,3-dimethyl-1,3-butadiene, chloroprene, 2,3-dichloro-1,3-butadiene, 1,3-cyclohexadiene, and 1,3-cyclooctadiene. In the preferred process of reacting ethylene with 1,3-butadiene in the presence of the catalyst described, the reaction product is 1,4-hexadiene.

Since the reaction desired involves the equimolecular addition of an alpha-monoolefin to a conjugated diene, it is sometimes preferred to employ approximately equimolar amounts of reactants. However, the molar ratio of alpha-monoolefin to conjugated diene is not critical and can vary from about 10:1 or more to about 1:10 or less. In typical batch reactions the ratio may be continually changing. Both reactants may be charged to the reaction vessel, continuously or batch-wise in any molar ratio desired. Alternatively, one of the reactants may be charged to the vessel, and the other reactant subsequently introduced. Frequently the conjugated diene is charged to the reaction vessel and the alpha-monoolefin, subsequently fed therein during the course of the reaction until the desired conversion of the conjugated diene to the 1,4-diene is obtained; this procedure may involve the use of a molar excess of the conjugated diene at the start.

The process of the present invention is carried out by contacting a mixture of the above-described monomers with a catalyst made from one or more of the above-described organo metallic compounds and one or more of the selected phosphorous complexes of nickel. Any organo aluminum compound, $RAIX_2$, of the above specified type or mixtures thereof can be employed in the present invention; within a single compound the X's may differ. The molecular weight of the organo aluminum compound is not critical; in general practice there is usually no practical advantage in employing compounds wherein the individual R groups have more than about 18 carbon atoms. Representative examples of aluminum trialkyls include: triethyl aluminum; tri n-propyl aluminum; triisopropyl aluminum; triisobutyl aluminum; tri n-amyl aluminum; tri n-octyl aluminum; tri n-decyl aluminum; tri n-dodecyl aluminum; tri n-hexadecyl aluminum; diethylpropyl aluminum; diisobutyl hexyl aluminum; and diisoamyloctyl aluminum.

Dialkyl aluminum monochlorides and dialkyl aluminum monobromides are particularly satisfactory aluminum compounds. Representative examples of these types include: diisobutyl aluminum monochloride, which is preferred; diethyl aluminum monochloride; diisobutyl aluminum monobromide; and the reaction product of 0.5 mole of aluminum chloride with 1.0 mole of triisobutyl aluminum.

Still other organo aluminum compounds include alkyl aluminum dichlorides and alkyl aluminum dibromides, typical examples being isobutyl aluminum dichloride and ethyl aluminum dibromide. Mixtures of two or more of the organo aluminum compounds can be used. The reaction product of 0.5 mole to 2 moles of aluminum trichloride (or tribromide or mixtures thereof) with a mole of aluminum trialkyl is also suitable.

Representative aryl and aralkyl metallic compounds include:

triphenyl aluminum;
diphenyl aluminum monochloride;
bis(p-tolyl) aluminum monochloride;
bis(p-chlorophenyl) aluminum monochloride;
bis(m-chlorophenyl) aluminum monochloride;
bis(3,4-dichlorophenyl) aluminum monochloride;
bis(p-fluorophenyl) aluminum monochloride;
dibenzyl aluminum monochloride;
tribenzyl aluminum;

tris(p-tolyl)aluminum;
diphenyl magnesium;
phenyl magnesium bromide;
diphenyl zinc;
di(p-tolyl)zinc;
diphenyl cadmium;
di(o-tolyl)cadmium;
di(p-chlorophenyl)cadmium.

Similar compounds containing condensed aromatic rings are also suitable as are compounds containing substituted aromatic rings in which the substituents do not interfere with catalysis under the conditions employed.

The preparation of aryl and aralkyl metallic compounds are respectively described in the following references: Organo-Metallic Compounds, G. E. Coates, John Wiley & Sons, Inc., New York, second edition (1960), 64, 69–70, 143–144; Handbook of Organometallic Compounds, H. C. Kaufman, D. Van Nostrand Co., Inc., New York (1961), 208; Organometallic Chemistry, ed. by H. Zeiss, Reinhold Publishing Corp., New York (1960), chapter 5 (Karl Ziegler), 198, 202, 243; German Patent 1,057,600 issued to Koster, Sept. 2, 1959; Ziegler et al., Ann, 629, 53 et seq. (1960); Proc. Acad. Sci. U.S.S.R. (Chem. Sect.) English transl., 143, 332–5 (1962); Revs. Pure Appl. Chem. (Australia) 13, 91–109 (1963); Belgian Patent No. 608,129.

Metal alkyls or alkyl metal halide compounds of zinc, cadmium, or magnesium, the lower alkyls of which are most common, can be substituted for part or all of the organo aluminum compounds given above. Typical compounds include diethyl zinc, dibutyl zinc, ethyl magnesium bromide, dimethyl magnesium, dibutyl magnesium, and dimethyl cadmium. Additional compounds are described in the book Organo Metallic Compounds by G. E. Coates, John Wiley & Sons, Inc., New York, second edition (1960).

The heart of the present invention is the combination of one or more of the above described organo metallic compounds with one or more nickel compounds containing at least one monodentate phosphorous III ligand, phosphine and phosphite complexes being representative types. Typical phosphorous complexes useful in the present invention fall within the following structural formulas: $(R'_3P)_2 \cdot NiX'_2$, $(R'O)_3P_n \cdot Ni(CO)_m$, $(R'_3P)_y \cdot Ni(CO)_z$ where $R'$ is alkyl, aryl, allyl and equivalent hydrocarbon radicals, collectively referred to as hydrocarbyl, or mixtures thereof; $X'$ is chlorine, bromine, iodine, nitrate, or mixtures thereof; $n$ is 2 or 3 and $n+m=4$; $y$ is 1 or 2 and $y+z=4$. When $R'$ is alkyl, lower alkyl is preferred so that catalyst activity per unit of weight thereof is not detracted from too greatly by the presence of high molecular weight alkyl radicals. "Phosphorous III" means P having a valence of three. A "monodentate" ligand is a complex forming ligand which has one and only one point of attachment to the metal (nickel). (P. 10 of Chemistry of the Metal Chelate Compounds, A. E. Martell and M. Calvin, Prentice-Hall, Inc., N.Y. (1952). Chemistry of the Coordination Compounds, J. C. Bailar, Jr., Reinhold Publishing Co., N.Y., 1956, pp. 220–221).

Representative complexes of this sort include dichlorobis(tributylphosphine)nickel,
dichlorobis(trimethylphosphine)nickel,
diiodobis(triethylphosphine)nickel,
diiodobis(triphenylphosphine)nickel,
dichlorobis(tribenzylphosphine)nickel,
dibromobis(dibenzylphenylphosphine)nickel,
diiodobis(benzyldiphenylphosphine)nickel,
dichlorobis(allylidiphenylphosphine)nickel,
dichlorobis(diethylphenylphosphine)nickel,
dibromobis(triethylphosphine)nickel,
dinitratobis(triethylphosphine)nickel,
dinitratobis(tributylphosphite)nickel dicarbonyl,
tris(triethylphosphite)nickel monocarbonyl,
tris(triphenylphosphite)nickel monocarbonyl,
triphenylphosphine nickel tricarbonyl,
bis(triphenylphosphine)nickel dicarbonyl,
bis(tributylphosphine)nickel dicarbonyl,
tributylphosphine nickel tricarbonyl, a 2:1 mixture of triphenylphosphine and bis(2,4-pentanediono)nickel II; a 2:1 mixture of triphenylphosphine and bis-(2,6-dimethyl-3,5-heptanediono)-nickel II; a 2:1 mixture of triphenylphosphine and bis-(2,2,6,6-tetramethyl-3,5-heptanediono)-nickel II. The bis-2,2,6,6-tetramethyl-3,5-heptanediono-nickel II is inoperable unless the triphenylphosphine is added; this seems to indicate the in situ formation of a P III complex. It is obviously possible, and included within the scope of the claims, to introduce precursors of the specified nickel component of the catalyst system and allow the said nickel catalyst component to be formed in situ. Example 29 is representative. Included within the term "Aryl" for R' are substituted aryls, the substituents of which do not harmfully detract from the catalytic action of the catalyst system, examples of which in the form of suitable complexes are as follows:

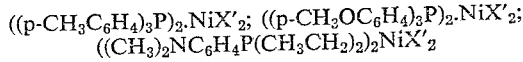

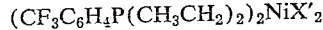

and $$(CF_3C_6H_4P(CH_3CH_2)_2)_2NiX'_2$$

These phosphorous complexes named and/or some equivalents thereof are described in the following references: M. C. Browing et al., J. Chem. Soc. 693 (1962); K. A. Jensen, Z. anorg. allegem. Chem. 229, 265 (1936); German Patent 841,589 (1952); German Patent 841,590; Vananzi J. Chem. Soc., 719 (1958) also Yamamoto et al., C. A. 50,3996; M. C. Browning, R. F. B. Davis et al., J. Chem. Soc. (1961) 4816; and R. C. Cass, G. F. Coates and R. G. Hayter, J. Chem. Soc., 4007 (1955). Phosphites are listed in such standard reference works as Handbook of Organo Metallic Compounds by Koffman, published by D. van Nostrand Corp.

In making the catalysts, the value of the molar ratio of the organometallic catalyst component to the nickel-containing component is important. It is essential that there be a molar excess of the organometallic component present. It has been observed that no significant amount of reaction occurred when the molar ratio of an alkyl aluminum compound to the nickel component is 1.0. Reaction is usually obtained at a molar ratio of about 2.0. The exact molar ratio at which catalytic activity begins will vary depending upon the particular catalyst components employed and reaction conditions. In general the higher values, such as 6 and 12, are often used. Higher ratios of organometallic compound to the nickel component, such as 60:1, can be employed but there is often no practical advantage in using amounts wherein the ratio is much above 12:1.

The catalyst can be premixed or it can be made partly or wholly in the presence of one or both of the monomers. The components can be added in any order. The nickel complex can be made in situ; more often, however, it is prepared separately and then mixed with the organometallic compound. The nickel compound may sometimes be less soluble than its complex in the reaction medium containing the monomers; in such cases, better results may be obtained by preparing the complex separately and then adding it to the reaction zone.

The reaction can be carried out over a wide range of temperatures. Values such as −10 to +100° C. are frequently employed. There is usually no advantage in operating at lower temperatures; furthermore, the additional refrigeration expense is not economically attractive. At temperatures above 100° C. the proportion of high boiling side-products (e.g. $C_8$ fractions) increases at the expense of the desired 1,4-diene in the reaction mixtures. In batch operations at temperatures well above 100° C., for example 150° C., 1,4-diene is formed in appreciably smaller amounts. Thus it is preferred not to exceed about 100° C. In continuous operations, temperatures above 100° C. can be used because the residence time can be shortened to minimize the undesired formation of high boilers.

The proportion of the catalyst in the monomer reaction zone can be varied widely. For economic reasons, it is desirable to use as little as possible consistent with a reasonable rate. Under operating conditions typical for all the conjugated dienes used here, a catalytic amount of catalyst is present when about at least 0.000025 g.-atom of nickel has been supplied for each g.-mole of conjugated diene; the preferred range is about 0.00005 to about 0.010 g.-atom per g.-mole. Proportions outside these ranges can be employed, if desired. Those skilled in the art can determine the optimum amount of a particular catalyst for a particular conjugated diene by routine experiments.

The operating pressure in the present invention is not critical. The process is generally carried out at pressures in the range of from about 50 to about 700 lb./sq./in. gauge. This represents a practical range of pressures for generally available reactors. Higher or lower pressures may be used, if desired. Thus the reaction can be carried out at atmospheric pressure by passing gaseous alpha-monoolefin into a solution of conjugated diene in an inert liquid diluent. Higher pressures such as 2000 atmospheres can be employed but there is no practical advantage in going up higher.

The conjugated diene, e.g., 1,3-butadiene, itself can frequently serve as the solvent. In order to operate at a convenient temperature, superatmospheric pressure is then employed. Frequently, however, the reaction is carried out in an inert organic liquid diluent. The term "inert" is taken to mean that the diluent will not deactivate the catalyst. Thus it is free from impurities such as alcohol and water and it does not contain groups bearing Zerewitinoff-active hydrogen atoms (e.g. hydroxyl groups, carboxyl groups, amino groups and the like). For optimum yields the diluent should not undergo side-reactions with the catalyst, the monomers, or the nonconjugated diene product. If it is desired to isolate the product from the reaction mixture, it is preferable that the diluent be conveniently separable; closely boiling the liquids are less suitable. Representative suitable diluents include: tetrachloroethylene; aromatic hydrocarbons such as toluene, cumene, and mixed xylenes; aliphatic and cycloaliphatic hydrocarbons such as octane and decalin; and ethers such as anisole. If the diluent is to be used for further reactions of the diene, e.g. copolymerization, it may be unnecessary to separate it. Then closely boiling liquids can also be used.

The inert diluents can be purified by drying them over silica gel. The gaseous alpha-monoolefins are purified by those procedures familiar to those skilled in the art of coordination catalysts involving organo aluminum compounds. Thus prior to its introduction into the reactor, the alpha-monoolefins ethylene is passed through systems such as the following: A column of silica gel, three traps containing 20% triisobutyl aluminum in a liquid petrolatum such as "Nujol" (available from Plough, Inc., Memphis, Tenn.), a trap containing liquid petroleum, and a final trap filled with the silica gel.

The time required for batch reaction depends on the temperature and pressures used, the catalyst concentration and the degree of conversion desired. In typical experiments the reaction time has ranged from about 5 minutes to 204 minutes. The practical range is from about 5 minutes to about 4 hours. The progress of the reaction can be followed by analyzing the reaction mass for the non-conjugated diene content by vapor phase chromotography.

In an embodiment of the process, which is applicable to all the conjugated dienes within the scope of the present invention, a reactor is swept with dry nitrogen and charged in turn, with an inert diluent and a phosphine or phosphite complex of a nickel compound. The reactor is then cooled and 1,3-butadiene is introduced into it. Agitation is begun. After the mixture has been heated to the desired temperature, ethylene is introduced to give the desired reactor pressure. The reaction is then started by injection of the organo aluminum compound under nitrogen pressure. At the end of the reaction time the catalyst is, optionally, deactivated by injection of an alcohol such as isopropyl alcohol. The reactor is then cooled to room temperature or below. The low boiling components are vented, preferably through a trap cooled to about −80° C. to collect unreacted 1,3-butadiene and low boilers such as butene. Thereafter the reactor is opened and the contents discharged. If alcohol is present, it is removed by water washing. The 1,4-hexadiene is collected from the liquid residue by fractional distillation thereof at atmospheric pressure or slightly below. The fractions boiling between about 35 and 85° C. are collected and may thereafter be further refined by additional fractional distillation if necessary. A typical purified sample containing at least 99% by weight 1,4-hexadiene boiled in the range 64.8–67° C. The purity of the product can be easily determined by vapor phase chromatographic analysis.

The 1,4-diene can be prepared by the process of the present invention in a continuous manner at atmospheric, superatmospheric, or subatmospheric pressure. Thus alpha-monoolefin, the conjugated diene, the nickel and organo metallic compounds or pre-mixed catalyst, and optionally an inert diluent, can be introduced continuously into the polymerization zone at such a rate as to provide a residence time sufficient to carry out the desired conversion of reactants to 1,4-diene in the reaction mass. The residence time may vary widely, for example from 15 minutes or less to several hours or more. The reaction mixture which continually overflows from the reaction zone is, optionally, contacted in a subsequent zone with a catalyst deactivator; 1,4-diene is ultimately obtained after suitable or batch purification and isolation procedures.

In operating the process of the present invention, either by continuous or batch procedures, the ratio of reactants can be regulated by means familiar to those skilled in the art. Thus when the reaction vessel has no free vapor space—that is, the reaction system is at all times full of liquid—the concentrations of alpha-monoolefin and 1,3-diene can be controlled merely by introducing the appropriate quantities of monomers. When the reaction is carried out in a vessel which has a vapor space, alpha-monoolefin and 1,3-diene concentrations are controlled by their partial pressures in the vapor space and by the reaction temperature.

The following examples are illustrative of the process of the present invention. In the examples, percents are by weight unless otherwise indicated, "Bu" may be used as an abbreviation for "butyl," and vapor phase chromatographic analysis is abbreviated as V-P-C analysis.

EXAMPLES

*General description.*—The 1,4-diene syntheses in the following examples (except for Example 10) were carried out in a 1.9-liter stainless steel autoclave equipped with an agitator, a gas inlet, a thermocouple well, a discharge leg, a vent, a pressure gauge, and a back-pressure regulator. The autoclave could be heated or cooled by means of immersion in a bath. The apparatus was sparged with nitrogen prior to the introduction of solvent and reagents. All solvents were dried and sparged with nitrogen prior to introduction into the reactor. All boiling points reported hereinafter were observed at atmospheric pressure unless otherwise noted.

EXAMPLE 1

A. Use of $NiCl_2 \cdot 2Bu_3P/(IsoBu)_2AlCl$ catalyst in tetrachloroethylene (ratio of Ni to 1,3-butadiene is 0.0008): After 66 grams of 1,3-butadiene had been distilled into an autoclave containing an agitated mixture of 0.534 gram (0.001 gram-mole) of nickel dichloride-bis(tributyl phosphine) complex in one liter of tetrachloroethylene at 0° C., ethylene was introduced while heat was applied. When the reactor was at 68° C. and 98 p.s.i.g., the reaction was started by injecting 1.2 cm.³ (0.006 gram-mole) of diisobutylaluminum chloride dissolved in 3 ml. of tetrachloroethylene (Al:Ni=6:1). After 9 minutes the temperature had risen to 72° C. and the pressure had increased to 102 p.s.i.g. The ethylene line was then closed. During the remaining 13 minutes of reaction time the pressure fell to 37 p.s.i.g. and temperature dropped to 64° C. Finally the reaction was stopped by addition of 3 ml. of isopropyl alcohol. After the low boilers had been vented off and collected in cold traps, the liquid residue was fractionally distilled. V-P-C analysis indicated that 1,4-hexadiene was the major component (64%) of the 57-gram fraction boiling between 52°–74° C.

B. Attempted use of $Bu_3P/(IsoBu)_2AlCl$ as a catalyst: An experiment was run outside the scope of the present invention to demonstrate the need for the nickel component of the catalyst combination. A 213-gram charge of 1,3-butadiene was distilled into an autoclave containing a mixture of 0.5 cc. (0.002 gram-mole) of tributyl phosphine in 1 liter of tetrachloroethylene. Afterward the mass was heated to 55° C., then ethylene was introduced (100 p.s.i.g.). After a tetrachloroethylene solution containing 0.006 gram-mole of diisobutyl aluminum chloride had been added, no evidence of reaction was observed during the subsequent 27-minute period at 55° C.

EXAMPLE 2

Use of $NiCl_2 \cdot 2Bu_3P/(IsoBu)_2AlCl$ catalyst (Ni:1,3-butadiene=0.00025): The general procedure of Example 1, paragraph A, was repeated except as noted hereafter. The 1,3-butadiene charge was increased to 200 grams. When the temperature had been raised to 20° C., ethylene was introduced to give a pressure of 100 lb./sq.in. gauge. At this point the addition of diisobutyl aluminum chloride caused the formation of an orange coloration indicative of an active catalyst. The reaction temperature was subsequently maintained between 15 and 25° C. for 1 hour. After the catalyst had thereafter been quenched and the reaction vented fractional distillation of the residue afforded 46 grams of distillate, boiling point 55–85° C., containing 84% 1,4-hexadiene by V-P-C analysis.

EXAMPLE 3

Use of $NiCl_2 \cdot 2Bu_3P/(IsoBu)_3Al$ catalyst in toluene: The general procedure of Example 1, paragraph A, was followed except as noted hereafter. A 186-gram charge of 1,3-butadiene was distilled into an autoclave containing an agitated mixture of 0.534 gram of the nickel dichloride bis(tributyl phosphine) complex and 1 liter of toluene at 0° C. After the temperature had been raised to 70° C., ethylene was introduced to give a pressure of 100 p.s.i.g. A solution of 1.5 ml. (6 millimoles) of triisobutyl aluminum in 3 ml. of toluene was injected under nitrogen pressure into the agitated mixture. The reaction was carried out for 45 minutes at 65–70° C. and 100 p.s.i.g. Fractional distillation gave 21 grams, boiling in the range 35–98° C. which contained 48% 1,4-hexadiene.

EXAMPLE 4

A. Use of $NiCl_2 \cdot 2Bu_3P/(IsoBu)_2AlCl$ catalyst in Decalin: The general procedure of Example 1, paragraph A, was repeated except as noted hereafter. A 224-gram charge of 1,3-butadiene was distilled into an autoclave containing an agitated mixture of 0.534 gram of nickel dichloride-bis(tributyl phosphine) complex and 1 liter of Decalin. The temperature was raised to 40° C. and ethylene introduced until the pressure was 100 p.s.i.g. Injection of a solution of 1.2-cc. of diisobutyl aluminum chloride (6 millimoles) in 3 ml. of Decalin under nitrogen pressure followed. The temperature was then gradually raised to 50° C. Thereafter the reactor was maintained at 49–59° C. by application of intermittent cooling during a total reaction time of 110 minutes at 100 p.s.i.g. The 1,4-hexadiene produced was isolated by fractional distillation. The main fraction (179 grams, boiling point 46–74° C.) contained 66% 1,4-hexadiene by V-P-C analysis.

B. Attempted use of $NiCl_2/(IsoBu)_2AlCl$ as a catalyst: An experiment was run outside the scope of the present invention by a procedure similar to that described in Example 4A above except that 0.001 gram-mole of nickel dichloride was substituted for the 0.001 gram-mole nickel complex called for. No significant reaction appeared to take place at 54–83° C.

EXAMPLE 5

The general procedure of Example 4, paragraph A, was repeated except that anisole was substituted for Decalin. Ethylene was introduced into the reactor which contained 228 grams of butadiene, 0.534 gram of $NiCl_2 \cdot 2Bu_3P$ and 1 liter of anisole, to give a pressure of 100 p.s.i.g. at 58° C. The addition of a solution of 0.006 gram-mole of $isoBu_2AlCl$ in 3 ml. of anisole did not appear to cause reaction. After 10 minutes, an additional 0.006 gram-mole of isoBu AlCl was added, which gave an active catalyst. The reaction was carried out for 130 minutes, at 49–52° C. and 100 p.s.i.g. pressure. Distillation afforded a 146-gram fraction, boiling point 51–81° C., containing 79% 1,4-hexadiene by V-P-C analysis.

EXAMPLE 6

Use of $NiCl_2 \cdot 2Bu_3P/(IsoBu)_2AlCl$ catalyst at low concentrations (Ni:1,3-butadiene 0.000026); Al:Ni very high (60:1): The apparatus described in Example 1, paragraph A, was employed.

After 209 grams of 1,3-butadiene had been distilled into an autoclave containing an agitated mixture of 0.0534 gram (0.0001 gram-mole) of nickel dichloride-bis(tributyl phosphine) complex and 1 liter of tetrachloroethylene at 0° C., heat was applied to raise the temperature to 58° C. Then ethylene was introduced until the reactor pressure was 100 p.s.i.g. After the reaction had been started by injection of 0.006 gram-mole of diisobutyl aluminum chloride, the mixture was stirred for 70 minutes at 50–60° C. A 30-gram fraction was obtained boiling between 55–77° C. containing 86% 1,4-hexadiene.

EXAMPLE 7

[Use of $NiCl_2 \cdot 2(Bu_3P)/(IsoBu)_2AlCl$ catalyst]

A. Al:Ni ratio 2:1: A 208-gram portion of 1,3-butadiene was introduced into an autoclave containing an agitated mixture of 1.068 gram (0.002-gram-mole) of nickel dichloride-bis(tributyl phosphine) complex in one liter of tetrachloroethylene at °0 C. After the temperature had been raised with external heat to about 56° C., ethylene was introduced until the reactor pressure was 100 p.s.i.g. Addition of 0.8 cc. (0.004 gram-mole) of diisobutyl aluminum chloride in 3 cc. of tetrachloroethylene then followed. The reaction was conducted for 2.5 hours at about 60° C. and 100 p.s.i.g. After the catalyst had been deactivated with isopropanol and the reactor cooled and vented, fractional distillation of the residue gave 187 grams, boiling point 55–85° C. containing 68% 1,4-hexadiene according to vapor phase chromatographic analysis.

B. Al:Ni ratio 1:1: A reaction was attempted outside the scope of the present invention. The general procedure of Part A above was repeated except that only 0.4 cc. (0.002 gram-mole) of diisobutyl aluminum chloride was employed. There was no evidence of reaction during a 75-minute period at 50–60° C. and 100 p.s.i.g.

EXAMPLE 8

Use of $NiCl_2 \cdot 2Bu_3P/(IsoBu)_2AlCl$ catalyst at 90–100° C.: The general procedure of Example 1, paragraph A, was repeated except that the amount of 1,3-butadiene was increased to 220 grams, and the temperature was maintained at 90–100° C. during a reaction time of 50 minutes at 100 p.s.i.g. At the time the diisobutyl aluminum chloride was injected, the reactor pressure was 100 p.s.i.g. and the temperature 88° C. Fractional distillation of the reaction mixture, after venting of low boilers, gave 85 grams of distillate, boiling point 50–87° C., containing 24% 1,4-hexadiene and 45% 2,4-hexadiene by V-P-C analysis.

EXAMPLE 9

Use of NiCl₂·2Bu₃P/IsoBuAlCl₂ catalyst: A solution of 6 millimoles of isobuAlCl₂ in 12 ml. of tetrachloroethylene was injected under nitrogen pressure into a stirred solution of 0.534 gram (0.001 gram-mole) of (Bu₃P)₂·NiCl₂

186 grams of 1,3-butadiene and 1 liter of decalin at 100 p.s.i.g. ethylene pressure and 46° C. A rapid temperature rise to 76° C. followed the addition of the aluminum compound. The reaction mixture was quickly cooled to 50° C. and maintained at 46–54° C. for 1 hour by intermittent cooling of the reactor. After deactivation of the catalyst by the addition of 3 ml. of isopropyl alcohol, the reactor was cooled and vented. Fractional distillation of the liquid afforded a 71-gram fraction, boiling point 48–68° C., containing 76% 1,4-hexadiene and a second 71-gram fraction, boiling point up to 98°/100 mm., containing 18% 1,4-hexadiene and 54% 2,4-hexadiene.

EXAMPLE 10

[Preparation of 1,4-hexadiene at atmospheric pressure

*Apparatus.*—The reactor was a one-liter glass resin kettle equipped with an agitator, two gas inlet tubes, a gas exit tube, and a thermometer.

*Procedure.*—Ethylene (about 1.4 liters/minute) and 1,3-butadiene (about 0.7 liter/minute) was separately fed as gases through the agitated reactor containing 0.534 gram (0.001 gram-mole) of NiCl₂·2(C₆H₅)₃P in one liter of tetrachloroethylene at 50° C. Several minutes later 1.2 cc. (0.006 gram-mole) of diisobutyl aluminum chloride in tetrachloroethylene was added to the saturated liquid mixture. During the following hour, the gases continued to enter at the above-described rates (a total of 104 grams of 1,3-butadiene was added) and the temperature was kept at 50° C. After the catalyst had been deactivated by introduction of 3 ml. of isopropyl alcohol, the reactor contents were distilled to obtain 8 grams of material, boiling point 56–85° C., containing 70% hexadiene by V-P-C analysis.

EXAMPLE 11

Use of NiCl₂·2Bu₃P/(IsoBu)₃Al catalyst in tetrachloroethylene: after ethylene had been introduced to establish a pressure of 100 lb./sq. in. gauge in an agitated reactor containing a mixture of 205 grams of 1,3-butadiene, 0.534 gram (0.001 gram-mole) of NiCl₂·2Bu₃P and 1 liter of tetrachloroethylene at 58° C., 1.5 cc. (0.006 gram-mole) of a solution of triisobutyl aluminum in 3 ml. of tetrachloroethylene was injected under nitrogen pressure. The resulting reaction mixture was agitated for 60 minutes at 50–60° C. Fractional distillation gave 75 grams of distillate, boiling point 54–90° C., containing 82% 1,4-hexadiene by V-P-C analysis.

EXAMPLE 12

A. Preparation of (Bu₃P)₂·Ni(NO₃)₂ complex:

(Bu₃P)₂·Ni(NO₃)₂ was prepared by the general method of the Jensen reference, previously cited from Ni(NO₃)₂·6H₂O and Bu₃P in ethanol; obtained, green crystals, melting point 69–73° (open capillary).

*Analysis.*—Calcd. for C₂₄H₅₄N₂NiO₆P₂: C, 49.1, H, 9.3. Found: C, 48.5, H, 9.0.

B. Use of Ni(NO₃)₂·2(Bu₃P)/(IsoBu)₂AlCl catalyst at −8 to 0° C.: 1,3-butadiene (213 grams) was distilled into a cold (<0° C.) agitated suspension of 0.587 gram (0.001 gram-mole) of (Bu₃P)₂·Ni(No₃)₂ in 1 liter of toluene. While the stirred mixture was still below 0° C., ethylene was introduced to give a reactor pressure of 25 p.s.i.g. A solution of 0.006 gram-mole of diisobutyl aluminum chloride in 3 ml. of toluene was then injected; at this time the reactor temperature was −2° C. The reaction appeared to set in immediately. After the pressure had been subsequently raised to 60 p.s.i.g., the reaction mixture was maintained at −8 to 0° C. for 115 minutes. (During this time the temperature reached +8° C. for a brief period.) Finally the catalyst was deactivated by the addition of 3 ml. of isopropyl alcohol and the reactor was vented. Distillation of the liquid residue afforded 128 grams of distillate, boiling point 48–90° C., containing 82% 1,4-hexadiene by V–P–C analysis.

EXAMPLE 13

Use of NiI₂·2(C₆H₅)₃P/(IsoBu)₂AlCl catalyst: A 192-gram charge of 1,3-butadiene was distilled into a reactor containing a mixture of 0.836 gram (0.001 gram-mole) of nickel diiodide bis(triphenyl phosphine) complex and 1 liter of tetrachloroethylene at 0° C. While the resulting composition was still cold, 50 lb./sq. in. (gauge) of ethylene and 1.2 cc. (0.006 gram-mole) of diisobutyl aluminum chloride were introduced, in turn. The resulting mixture was then heated to 57° C. and after a total time of 24 minutes, an additional 1.2 cc. portion of diisobutyl aluminum chloride was introduced. Reaction then occurred and the pressure was increased to 100 p.s.i.g. The mixture was maintained thereafter at 50–60° C. for three hours. After the catalyst had been deactivated with 3 ml. of isopropyl alcohol, the mixture was cooled and vented. Fractional distillation of the liquid residue gave 143 grams of distillate, boiling point 54–90° C., containing 64% 1,4-hexadiene by V–P–C analysis.

EXAMPLE 14

Use of

NiCl₂·2[(C₆H₅)₂P—CH₂—CH=CH₂]/(isoBu)₂AlCl catalyst: Ethylene was introduced into a solution of 0.582 gram (0.001 gram-mole) of dichlorobis(allyldiphenylphosphine) nickel, and 225 grams of 1,3-butadiene in 1 liter of tetrachloroethylene to give a reactor pressure of 90 p.s.i.g. at 62° C. A solution of 1.2 ml. (0.006 gram-mole) of diisobutyl aluminum chloride in 3 ml. of tetrachloroethylene was then injected. The temperature was maintained near 70° C. for 50 minutes; the pressure was then raised to 100 p.s.i.g. for an additional reaction time of 25 minutes at 72–78° C. The catalyst was deactivated by the addition of 3 ml. of isopropyl alcohol and the reactor was cooled and vented. Distillation of the liquid residue afforded a 78-gram fraction, boiling point 50–90° C., which was combined with a residue (14 grams) obtained by distillation of the low boilers collected in the trap during venting of the reactor. The total product (92 grams) was analyzed by V-P-C and found to contain 78% 1,4-hexadiene.

EXAMPLE 15

[Use of Ni(CO)₂·2(C₆H₅—O—)₃P/(IsoBu)₂AlCl catalyst]

A. Tetrachloroethylene solvent: Two hundred grams of 1,3-butadiene were distilled into the reactor containing 0.735 gram (0.001 gram-mole) of nickel dicarbonyl bis(triphenyl phosphite) complex and 1 liter of tetrachloroethylene at 0° C. After the resulting composition had been heated to 60° C., ethylene was introduced to give a reactor pressure of about 100 lbs./sq. in. (gauge). The subsequent addition of 1.2 cc. (0.006 gram-mole)

of diisobutyl aluminum chloride in 3 ml. of tetrachloroethylene caused the formation of a pale yellow color; fifteen minutes later the reaction appeared to start. When the mixture has been maintained for 90 minutes at about 60° C., the catalyst was deactivated with 3 ml. of isopropyl alcohol. After the reactor had been cooled to room temperature and vented, fractional distillation of the liquid residue afforded 24 grams of distillate, boiling point 50–77° C., containing 84% 1,4-hexadiene by V–P–C analysis.

B. Decalin solvent: The above-described procedure for Part A was essentially repeated except as noted hereafter. One liter of Decalin was substituted for the liter of tetrachloroethylene and 191 grams of 1,3-butadiene were used. Twenty-five minutes after the diisobutyl aluminum chloride had been introduced, a second portion of the same size was added. Following a subsequent induction period of about 50 minutes, the reaction became noticeably active; the mixture was agitated thereafter for 2 hours at 60° C. The liquid residue in the reactor gave, on fractionation, 109 grams of distillate boiling between 52 and 65° C. at atmospheric pressure and up to 70° C. at 300 mm. pressure and containing 66% 1,4-hexadiene by V–P–C analysis.

EXAMPLE 16

[Use of $Ni(CO)_2 \cdot 2(C_6H_5)_3P/(IsoBu)_2AlCl$ catalyst]

A. Tetrachloroethylene solvent: A 203-gram sample of 1,3-butadiene was distilled into a stainless steel autoclave containing an agitated mixture of 0.4 gram of a nickel carbonyl-triphenyl phosphine complex and 1 liter of tetrachloroethylene at 0° C. After the temperature was raised to 57° C., ethylene was introduced to give a reactor pressure of 100 lb./sq. in. (gauge). Injection of 1.2 cc. (0.006 gram-mole) of diisobutyl aluminum chloride in 3 ml. of tetrachlorethylene caused an immediate temperature rise to 63° C. During the following hour, the temperature was maintained at 50–60° C. by application of external cooling. The exothermic reaction was stopped by addition of 3 ml. of isopropyl alcohol and the reactor was cooled to room temperature and vented. Fractional distillation of the remaining liquid gave 104 grams of distillate, boiling point 54—97° C. containing 19% 1,4-hexadiene and 61% 2,4-hexadiene.

B. Decalin solvent: Ethylene was introduced to give a pressure of 100 lb./sq. in (gauge) in a stainless steel reactor containing an agitated mixture of 193 grams of 1,3-butadiene, 0.4 gram of the nickel carbonyl-tri-phenyl-phosphine complex, and 1 liter of Decalin at 58° C. A solution of 0.006 gram-mole of diisobutyl aluminum chloride in 3 ml. of Decalin was then injected. Thereafter the temperature was raised to about 70° C. by application of heat. After a total time of about 45 minutes, the reaction appeared to start. For 45 minutes thereafter, the mixture was maintained at 74–79° C. After the catalyst had been deactivated with isopropanol, the reactor was cooled below room temperature, vented, and the liquid residue fractionally distilled. There was obtained a fraction weighing 53 grams boiling between 55 and 65° C. at 1 atmosphere and up to 36° C. at 194 mm. pressure. Vapor phase chromatographic analysis of this fraction indicated the presence of 83% 1,4-hexadiene.

EXAMPLE 17

Use of $NiCl_2 \cdot 2(CH_3)_3P/(IsoBu)_2AlCl$ catalyst: Ethylene (100 p.s.i.g.) was introduced into a stainless steel reactor containing an agitated mixture of 216 grams of 1,3-butadiene, 0.282 gram (0.001 gram-mole) of nickel dichloride bis(trimethyl-phosphine complex) and 1 liter of tetrachloroethylene at 55° C. Then 1.2 ml. (0.006 gram-mole) of diisobutyl aluminum chloride in 3 ml. of tetrachloroethylene were injected. After the mixture had been agitated for one hour and twenty-five minutes at 55° C., the catalyst was deactivated with 3 ml. of isopropyl alcohol and the mixture was cooled to room temperature and vented. Fractional distillation of the liquid residue gave 91 grams of a fraction boiling up to 75° C. at atmospheric pressure and containing 81% 1,4-hexadiene by V–P–C analysis.

EXAMPLE 18

Premixed catalyst $(Bu_3P)_2NiCl_2/isoBu_2AlCl$: To a solution of ethylene and 215 grams of 1,3-butadiene in 1 liter of tetrachloroethylene at 67° C. and 100 p.s.i.g. was added a solution of 0.534 gram (0.001 gram-mole) of $(Bu_3P)_2NiCl_2$ and 1.2 ml. (0.006 gram-mole) of $isoBu_2AlCl$ in 15 ml. of tetrachloroethylene. Two to three minutes elapsed between the mixing of the catalyst components and the addition of this solution to the reaction mixture. The reaction of the olefins was conducted for 20 minutes and then was quenched with 3 ml. of isopropanol. The reactor was cooled and vented. Fractional distillation of the remaining liquid gave 38 grams of distillate, boiling point 52–80° C., containing 78% 1,4-hexadiene by V–P–C analysis.

EXAMPLE 19

A. Ethylene (101 p.s.i.g.) was introduced into a stainless steel reactor containing an agitated mixture of 81 g. of 1,3-pentadiene, 0.534 g. (0.001 gram-mole) of nickel dichloride bis(tributylphosphine) complex, and 1100 ml. of tetrachloroethylene at 71° C. A solution of 0.006 gram-mole of diisobutyl aluminum chloride in 4 ml. of tetrachloroethylene was then injected. After the mixture had been agitated for about one hour at 71–75° C., the catalyst was deactivated with 3 ml. of isopropyl alcohol and the mixture was cooled to room temperature and vented. Fractional distillation of the liquid residue gave 28 g. of 3-methyl-1,4-hexadiene boiling at 83–84° C. at atmospheric pressure and exhibiting a refractive index of $n_D^{25}$ of 1.4135.

B. The procedure of Part A above was repeated except for the following changes: 51.4 g. of 2,4-hexadiene was substituted for the 1,3-pentadiene; 500 ml. of benzene was employed as the solvent in place of all of the tetrachloroethylene; the reaction was run for 20 minutes at a temperature ranging between 40 and 74° C. Fractional distillation of the liquid residue gave 22 g. of a mixture boiling between 108 and 109.4° C. at atmospheric pressure and having a refractive index of 1.4213–1.4220. This mixture contained 3-ethyl-1,4-hexadiene and 3-methyl-1,4-heptadiene.

EXAMPLE 20

The procedure of Part A of Example 19 was repeated except that 98.5 g. of isoprene was substituted for the 1,3-pentadiene and the temperature was allowed to range between 77 and 85° C. Fractional distillation gave 29 g. of 4-methyl-1,4-hexadiene boiling at 91–93° C. at atmospheric pressure and exhibiting a refractive index $n_D^{25}$ of 1.4232.

EXAMPLE 21

The general procedure of Part A of Example 19 was employed except for the following changes: 98.7 g. of 1,3-butadiene was substituted for 1,3-pentadiene; propylene (102 p.s.i.g.) was substituted for ethylene; and the reaction was run for 94 minutes at a temperature ranging between 75 and 90° C. Fractional distillation gave 41 g. of 2-methyl-1,4-hexadiene boiling at 91–92° C. at atmospheric pressure and exhibiting a refractive index $n_D^{25}$ of 1.4203.

EXAMPLE 22

The general procedure of Part A of Example 19 was repeated except for the following changes: 96.5 g. of 1,3-butadiene was employed in place of 1,3-pentadiene; 131 g. of 1-hexene was substituted for ethylene; the reaction was run for 94 minutes at 81–92° C. Fractional distillation gave about 6 g. of 2-butyl-1,4-hexadiene boiling at 58–61° C. (18 mm. Hg) and exhibiting a refractive index $n_D^{25}$ of 1.4392.

EXAMPLE 23

Propylene was introduced to give a pressure of 76 p.s.i.g. in a stainless steel reactor containing an agitated mixture of 113 g. of isoprene, 0.534 g. (0.001 gram-mole) of $(Bu_3P)_2NiCl_2$ and 400 ml. of n-hexane at 70° C. A solution of 0.006 gram-mole of diisobutyl aluminum chloride in 4 ml. of n-hexane was then injected. Thereafter, the temperature was maintained at 71.5–93° C. for 158 minutes. After the catalyst had been deactivated with isopropanol, the reactor was cooled to room temperature, vented, and the liquid residue fractionally distilled. A 10.0 g. yield of 2,4-dimethyl-1,4-hexadiene was obtained boiling at 72–73°/194 mm. Hg.

EXAMPLE 24

Ethylene was introduced to give a pressure of 80 p.s.i.g. in a stainless steel reactor containing an agitated mixture of 48 g. of 1,3-cyclohexadiene, 0.534 g. (0.001 gram-mole) of $(Bu_3P)_2NiCl_2$ and 400 ml. of Decalin at 67° C. A solution of 0.006 gram-mole of diisobutyl aluminum chloride in 3 ml. of Decalin was then injected. Thereafter the temperature was maintained at 66–78° C. for 17 minutes. After the catalyst had been deactivated with isopropanol, the reactor was cooled below room temperature, vented, and the liquid residue fractionally distilled. A 30-gram yield of 3-vinylcyclohexene was obtained boiling at 58° C./73 mm. Hg to 61° C./74 mm. Hg and displaying a refractive index $n_D^{25}$ of 1.4647–1.4648.

EXAMPLE 25

The general procedure of Example 24 was repeated except for the following changes: 104.5 g. of 1,3-cyclooctadiene was employed in place of 1,3-cyclohexadiene and 400 ml. of n-hexane was substituted for Decalin as the solvent. The reaction was run for 12 minutes at a temperature between 65 and 75° C. Fractional distillation of the residue gave 19 g. of 3-vinyl-cyclooctene boiling at 59° C./12 mm. Hg–60.3° C./13 mm. Hg and displaying a refractive index of 1.4801.

EXAMPLE 26

200 grams of 2-chloro-1,3-butadiene was charged to a stainless steel reactor containing 0.534 g. (0.001 gram-mole) of $(Bu_3P)_2NiCl_2$ and 400 ml. of n-hexane at 25° C. After the resulting agitated composition had been heated to 50° C., ethylene was introduced to give a reactor pressure of about 104 p.s.i.g. The subsequent addition of 1.6 cc. (0.008 gram-mole) of diisobutyl aluminum chloride in 4 ml. of tetrachloroethylene caused the reaction to start. After the mixture had been agitated for 40 minutes at a temperature ranging between 50 and 59° C., the catalyst was deactivated with 3 ml. of isopropyl alcohol. After the reactor had been cooled to room temperature and vented, 96.5 g. of 4-chloro-1,4-hexadiene was obtained, boiling point 114–115° C. at atmospheric pressure.

EXAMPLE 27

The procedure of Example 26 was repeated except for the following changes: 110 g. of 2,3-dichloro-1,3-butadiene was substituted for the 2-chloro-1,3-butadiene and the reaction was stopped after 5 minutes during which time the temperature had increased from 48–70° C. Fractional distillation gave 1.4 g. of material boiling between 61 and 77° C. (25 mm. Hg); the infrared spectrum was suggestive of the expected codimer, 4,5-dichloro-1,4-hexadiene.

EXAMPLE 28

Bis(tri-n-butylphosphine)nickel II dichloride (0.534 g.) (0.001 gram-mole) was dissolved in 1.1 liters of dry oxygen-free Decalin. 2-chloro-1,3-butadiene (dried over silica gel and containing stabilizer), 163 g., was then added. After the mixture had been warmed to 43° C., ethylene was charged until the total pressure was 100 p.s.i. at 38° C. The reaction was begun by injecting 5 ml. of a 25% solution of diethyl zinc in heptane. After the mixture had been stirred at 38–65° C. for 2 hours and 19 minutes, 3 ml. of isopropanol were added to deactivate the catalyst. The mixture was cooled and vented. Fractional distillation of the liquid residue gave 6.3 g. of 4-chloro-1,4-hexadiene boiling at 63–64° C. (130 mm. Hg).

EXAMPLE 29

Nickel acetyl(acetonate) (0.257 g., 0.001 gram-mole) and 0.524 g. (0.002 gram-mole) of triphenylphosphine were dissolved in 1.1 liters of tetrachloroethylene at 25° C. A 114.7 gram charge of 1,3-butadiene was distilled into the pale green solution and the mixture was warmed to 65° C. Ethylene was then charged until the total pressure was 105 p.s.i.g. at 69.5° C. Introduction of 1.2 ml. (0.006 gram-mole) of diisobutyl aluminum monochloride in 4 ml. of tetrachloroethylene resulted in the immediate formation of an orange amber color and the consumption of ethylene. After the mixture had been stirred for 45 minutes at 69–71° C., the catalyst was deactivated with 3 ml. of isopropanol, cooled and vented. The product mixture was then distilled to afford 19.0 g. B.P. 43–90° C. This distillate was combined with 4.0 g. of liquid residue from the cold traps and the mixture was analyzed by vapor phase chromatography. The analysis indicated that 54% of the material was 1,4-hexadiene.

EXAMPLE 30

A 0.524-gram (0.002 gram-mole) charge of triphenylphosphine was added at 25° C. to a solution of 0.425 gram (0.001 gram-mole) of bis(2,2,6,6-tetramethyl-3,5-heptanediono) nickel II contained in 1.1 liters of dry deoxygenated tetrachloroethylene at 25° C. After the mixture had been cooled to 0° C., 97 g. of 1,3-butadiene was distilled into the violet solution. The temperature of the solution was then raised to 62° C. by external heating. Ethylene was introduced until the total pressure was 97 p.s.i. at 63° C. Upon injection of 1.2 ml. (0.006 gram-mole) of diisobutyl aluminum monochloride in 4 ml. of perchloroethylene, the mixture immediately became dark amber and a pressure drop occurred. The mixture was agitated for 55 minutes at 63–68° C. It was then cooled to room temperature and vented. There was obtained 72 g. of $C_6$ dienes, 71% of which was 1,4-hexadiene.

EXAMPLE 31

A 111 gram charge of 1,3-butadiene was distilled into the reactor containing a solution of 0.534 gram (0.001 gram-mole) of bis(tri-n-butylphosphine)nickel dichloride in 1.1 liters of dry deoxygenated tetrachloroethylene. After the mixture had been heated to 65° C., ethylene was charged until the total pressure was 102 p.s.i. at 63.5° C. Five milliliters of a 25% solution of diethyl zinc in heptane (0.006 gram-mole) was then charged into the reactor with high pressure nitrogen. The mixture immediately turned pale orange and solid particles precipitated. The pressure fell during the succeeding 43 minutes during which the temperature ranged from 63° to 75° C. After the catalyst had been deactivated by addition of isopropanol, the mixture was cooled to room temperature and vented. The product mixture was then distilled, affording 46 g. B.P. 44–90° C. Vapor phase chromatography of this mixture indicated that 43 g. of $C_6$ dienes were present and that 87% was 1,4-hexadiene.

EXAMPLE 32

A. Preparation of ethyl magnesium bromide: A 2.07 ml. (3-gram) charge of ethyl bromide was added from a syringe portion wise to a mixture of 0.583 g. (0.024 gram-mole) of magnesium turnings encovered with ether in a flask. Cooling was applied to control the exothermic reaction. The mixture was then warmed to room temperature and refluxed for a short while. After 5 minutes it was cooled to about 15° C. and stirred for 1.5 hours. The homogeneous dark solution was then concentrated to a volume of about 12 ml.

B. Formation of 1,4-hexadiene: Ethylene was charged into a reactor at about 59° C. containing 0.534 gram (0.001 gram-mole) of bis(tri-n-butylphosphine) nickel dichloride, 1.1 liter of tetrachloroethylene, and 101 g. of 1,3-butadiene. When the pressure was 102 p.s.i.g. at 63° C., ethylene introduction was stopped and 6 ml. of the ethyl magnesium bromide solution prepared above in benzene was then charged to the reactor. The mixture immediately became cloudy and amber red in color. A second 6 ml. portion of Grignard solution was then charged. After the mixture had been stirred at 66–74.5° C. for 97 minutes, the catalyst was deactivated by addition of isopropanol, the mixture was cooled to room temperature, and vented. During the reaction time the temperature ranged between 63 and 75° C. Distillation of the product mixture afforded 16.0 g. B.P. 39–85° C. Vapor phase chromatography of this mixture indicated that 6.4 g. were $C_6$ dienes and that 90.5% of the 6.4 g. was 1,4-hexadiene.

EXAMPLE 33

A. Preparation of bis - (p - chlorophenyl)aluminum monochloride: Bis(p - chlorophenyl)mercury was prepared from p-chloroaniline and mercuric chloride by the diazotization method given in Organic Syntheses, coll. vol. II, page 381. This product (105 grams, 0.25 gram-mole) was then converted to the corresponding tris(p-chlorophenyl)aluminum with excess aluminum metal (22 grams, 0.82 gram-mole) in 500 cc. boiling xylene under nitrogen (see H. Gilman and K. E. Marple, Rec. Trav. Chim., 55, 133 (1936); W. Z. Menael, Zeit. Anorg. A. Allgem. Chem. 269, 52 (1952)). The product was not isolated but allowed to react with a stoichiometric quantity (11.2 grams, 0.0834 gram-mole) of aluminum chloride in xylene solution at 90–100° C. for 30 minutes. Hot filtration gave the product as fluffy, colorless needles.

B. Formation of 1,4-hexadiene: Bis-p-chlorophenyl) aluminum chloride (2.48 grams, 0.008 gram-mole) (weighed in a dry box under nitrogen) was charged to the reactor containing 1.1 liters of dry nitrogen-sparged tetrachlorethylene. After 97 grams of 1,3-butadiene had been distilled into the reactor, the mixture was warmed to 70° C., and ethylene was introduced until the total pressure at equilibrium was 96 p.s.i.g. at 78° C. A solution of 0.00071 gram-mole of [(n-Bu)₃P]₂NiCl₂ in 20 milliliters of tetrachloroethylene was then charged. Immediately the color of the mixture became amber, heat was evolved, and the pressure fell. In two minutes the temperature had reached 100° C. and the pressure had become 70 p.s.i.g. After 8 minutes total reaction time, the temperature was 82° C. and the pressure was 70 p.s.i.g. After the catalyst had been deactivated by addition of 3 milliliters of isopropanol, the reactor was cooled below room temperature and vented slowly through 2 dry ice-acetone cooled traps. Fractional distillation gave 75.8 grams of liquid boiling between 44 and 92° C. V-P-C analysis indicated 59.5% 1,4-hexadiene was present.

EXAMPLE 34

A. Preparation of di(p-tolyl)aluminum monochloride: Di(p-tolyl)mercury (commercially available from Anderson Chemical Company) (99.1 grams, 0.259 gram-mole) was converted to di(p-tolyl)aluminum monochloride according to the procedure set out in Part A of Example 33 using 28 grams (1.04 gram-mole) aluminum metal, 500 cc. xylene, and 11.5 grams (0.086 gram-mole) of reagent grade granular aluminum chloride. Hot filtration gave the product in the form of nearly colorless fine needles.

B. Formation of 1,4-hexadiene: A 23.5-ml. portion of a 0.34 molar solution of di(p-tolyl)aluminum monochloride (0.008 gram-mole) in tetrachloroethylene was charged into the reactor containing 1.1 liters of tetrachloroethylene. After 100 grams of 1,3-butadiene had been distilled in, the mixture was heated to 62.5° C. Then ethylene was added (giving a pressure of 100 p.s.i.g.). Finally 5 milliliters of a solution of 0.534 gram (0.001 gram-mole) of [(n-Bu)₃P]₂NiCl₂ in tetrachloroethylene was charged. After 48 minutes at 64–67° C., the reaction was quenched by addition of 3 milliliters of isopropanol. A workup acording to Example 33 gave 108 grams of distillate boiling between 43 and 110° C.; V-P-C analysis indicated that 61.2% 1,4-hexadiene was present.

The 1,4-dienes produced by the process of the present invention and as exemplified in the foregoing examples are purified by washing with water to remove alcohol. The washed material, after drying over silica gel, is stabilized with N-phenyl-β-naphthylamine.

As many widely different embodiments of this invention may be made without departing from the spirit and scope thereof, it is to be understood that this invention is not limited to the specific embodiments thereof except as defined in the appended claims.

What is claimed is:

1. A process for the preparation of 1,4-dienes, comprising contacting and reacting an alpha-monoolefin of the formula R″—CH=CH₂, wherein R″ is a radical selected from the group consisting of H and C₁–C₄ alkyl, and a conjugated diene which is co-dimerizable therewith to form a product free of allylic halide, said diene containing up to 16 carbon atoms, in contact with a catalytic amount of a catalyst made by combining (a) at least two molar proportions of at least one organo metallic compound of the formula RMX$_n$, wherein R is a radical selected from the group consisting of alkyl, aryl, and aralkyl, M is a metal selected from the group consistinig of aluminum, zinc, cadmium, and magnesium, $n$ is an integer representing the number of X groups required for valence satisfaction, and X is independently selected from the group consisting of alkyl, aryl, aralkyl, chlorine, and bromine, with (b) a molar proportion of at least one nickel compound containing at least one monodendate phosphorous III ligand, said nickel compound being selected from the group consisting of nickel halide, nitrate, and carbonyl, and obtaining a 1,4-diene as a result thereof.

2. The process of claim 1, wherein said conjugated diene is of the formula

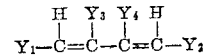

wherein Y₁ and Y₂ are independently selected from the group consisting of hydrogen and lower alkyl and wherein Y₃ and Y₄ are independently selected from the group consisting of hydrogen lower alkyl, and chlorine, with the proviso that at least one Y is hydrogen.

3. The process of claim 2, wherein two of said Y's are joined together to form a cycloaliphatic ring having at least 6 ring carbon atoms.

4. The process of claim 1, wherein the amount of said catalyst present is at least about 0.000025 to about 0.010 g-atom of nickel for each g-mole of said conjugated diene present in the contacting and reacting step.

5. A process for the preparation of 1,4-dienes, comprising contacting and reacting an alpha-monoolefin of the formula R″—CH=CH₂, wherein R″ is a radical selected from the group consisting of H and C₁–C₄ alkyl, and a conjugated diene of the formula

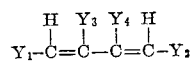

wherein Y₁ and Y₂ are independently selected from the group consisting of hydrogen and lower alkyl and wherein Y₃ and Y₄ are independently selected from the group consisting of hydrogen, lower alkyl, and chlorine, with the provisio that at least one Y is hydrogen, in contact with a catalytic amount of a catalyst made by combining (a) at least one organo metallic ompound of the formula RMX$_n$ wherein R is a radical selected from the group consisting of alkyl, aryl, and aralkyl, M is a metal selected from the group consisting of aluminum, zinc, cadmuim, and magnesium, n is an integer representing the number of X groups required for valence satisfaction, and X is independently selected from the group consisting of alkyl, aryl, aralkyl, chlorine, and bromine, with (b) at least one nickel compound containing at least one monodendate phosphorous III ligand, said nickel compound being selected from the group consisting of nickel halide, nitrate, and carbonyl, the proportions of (a) and (b) with respect to each other being such that the ratio M:Ni is at least 2:1, and obtaining a 1,4-diene as a result thereof.

6. The process as recited in claim 5, wherein said complex is a phosphine complex of a nickel compound.

7. The process as recited in claim 5, wherein said complex is a phosphite complex of a nickel compound.

8. The process as recited in claim 5, wherein (b) is a phosphorous complex of a nickel compound having a formula selected from the group consising of $(R'_3P)_2 \cdot NiX'_2$, $[(R'O)_3P]_n \cdot Ni(CO)_m$, and $(R'_3P)_y \cdot Ni(CO)_z$, wherein R' is selected from the group consisting of alkyl, aryl, allyl, and mixtures thereof, X' is selected from the group consisting of chlorine, bromine, iodine, nitrate and mixtures thereof, and $n$, $m$, $y$, and $z$ are integers having the values: $n=2$ and 3 and $n+m=4$, and $y=1$ and 2 and $y+z=4$.

9. A process for the preparation of 1,4-hexadiene, comprising contacting and reacting ethylene and 1,3-butadiene in contact with a catalytic amount of a catalyst made by combining (a) at least two molar proportions of at least one organo aluminum compound of the formula $RAlX_2$, wherein R is a radical selected from the group consisting of alkyl, aryl, and aralkyl and each X is independently selected from the group consisting of alkyl, aryl, aralkyl, chlorine, and bromine, with (b) a molar proportion of at least one nickel compound containing at least one monodentate phosphorous III ligand, said nickel compound being selected from the group consisting of nickel halide, nitrate, and carbonyl, and obtaining as a result thereof 1,4-hexadiene.

10. The process of claim 1, wherein said complex is a phosphine complex of a nickel compound.

11. The process of claim 9, wherein said complex is a phosphite complex of a nickel compound.

12. The process of claim 9, wherein the contacting and reacting step is carried out at a temperature between about −10° C. to about 150° C.

13. The process of claim 9, wherein the amount of said catalyst present is at least about 0.000025 to about 0.010 g-atom of nickel for each g-mole of 1,3-butadiene present in the contacting and reacting step.

14. The process of claim 9, wherein the contacting and reacting step is carried out in the presence of an inert organic solvent.

15. The process of claim 14, wherein the inert organic solvent is tetrachloroethylene.

16. A process for the preparation of 1,4-hexadiene, comprising contacting and reacting ethylene and 1,3-butadiene in contact with a catalytic amount of a catalyst made by combining (a) an organo aluminum compound of the formula $RAlX_2$, wherein R is a radical selected from the group consisting of alkyl, aryl, and aralkyl and each X is selected from the group consisting of alkyl, aryl, aralkyl, chlorine, and bromine, and mixtures thereof, with (b) a complex of a nickel compound, said complex being selected from the group consisting of phosphine and phosphite, said nickel compound being selected from the group consisting of nickel halide, nitrate, carbonyl, and mixtures thereof, the proportions of (a) and (b) with respect to each other being such that the ratio Al:Ni is at least 2:1, and obtaining as a result thereof 1,4-hexadiene.

17. The process of claim 16, wherein said organo aluminum compound is dialkyl aluminum halide.

18. The process of claim 16, wherein the complex is tri(hydrocarbyl)phosphine nickel halide.

19. The process of claim 16, wherein the complex is tri(hydrocarbyl)phosphine nickel nitrate.

20. The process of claim 16, wherein (a) is dialkyl aluminum halide and (b) is a tri(hydrocarbyl)phosphine complex of nickel halide.

21. The process of claim 16, wherein (a) is dialkyl aluminum halide and (b) is a tri(hydrocarbyl)phosphine complex of nickel nitrate.

22. A process for the preparation of 1,4-hexadiene, comprising contacting and reacting ethylene and 1,3-butadiene in contact with an inert organic solvent and a catalyst made by combining (a) an organo aluminum compound of the formula $RAlX_2$, wherein R is a radical selected from the group consisting of alkyl, aryl, and aralkyl, and each X is independently selected from the group consisting of alkyl, aryl, aralkyl, chlorine, and bromine, with (b) a phosphorous complex of a nickel compound having a formula selected from the group consisting of $(R'_3P)_2 \cdot NiX'_2$, $[(R'O)_3P]_n \cdot Ni(CO)_m$, and $$(R'_3P)_y \cdot Ni(CO)_z$$

wherein R' is selected from the group consisting of alkyl, aryl, allyl, and mixtures thereof, X' is selected from the group consisting of chlorine, bromine, iodine, nitrate and mixtures thereof, and $n$, $m$, $y$, and $z$ are integers having the values: $n=2$ and 3 and $n+m=4$, and $y=1$ and 2 and $y+z=4$; the proportions of (a) and (b) with respect to each other being such that the ratio Al:Ni is at least 2:1, the amount of catalyst being such that from about 0.000025 to about 0.010 g-atom of nickel is present in the contacting and reacting step for each g-mole of 1,3-butadiene employed therein, and obtaining as a result thereof 1,4-hexadiene.

23. The process of claim 22, wherein (a) is diisobutyl aluminum monochloride.

24. The process of claim 22, wherein (b) is triphenyl phosphine complex of nickel chloride.

25. The process of claim 22, wherein (b) is triphenyl phosphine complex of nickel nitrate.

26. The process of claim 22, wherein (b) is tributyl phosphine complex of nickel chloride.

27. The process of claim 22, wherein (b) is tributyl phosphine complex of nickel nitrate.

28. The process of claim 22, wherein said catalyst is (hydrocarbyl)phosphine nickel carbonyl.

References Cited by the Examiner

UNITED STATES PATENTS

| | | | |
|---|---|---|---|
| 2,349,173 | 5/1944 | Joshel | 260—666 |
| 3,152,195 | 10/1964 | Verbanc | 260—680 |
| 3,238,265 | 3/1966 | Mueller | 260—666 |
| 3,250,817 | 5/1966 | Lapporte | 260—666 |

DELBERT E. GANTZ, *Primary Examiner.*

R. SHUBERT, *Assistant Examiner.*